Patented Mar. 1, 1938

2,109,883

UNITED STATES PATENT OFFICE 2,109,883

PROCESS FOR THE PRODUCTION OF POLYMERIZED VINYL ALCOHOL

Willy O. Herrmann and Wolfram Haehnel, Munich, and Herbert Berg, Burghausen, Germany, assignors, by mesne assignments, to Chemische Forschungsgesellschaft, m. b. H., Munich, Germany, a corporation of Germany No Drawing. Application December 14, 1933, Serial No. 702,364. In Germany December 24, 1932

7 Claims. (Cl. 260—2)

This invention relates to the preparation of polymerized vinyl alcohol, and has for its object to provide an improved process whereby polymerized vinyl alcohol of different degrees of polymerization, of different properties and of different viscosity and water solubility can be readily produced as desired according to the uses to which the product is to be put.

In U. S. P. #1,672,156 to Herrmann et al., a process is disclosed whereby polymerized vinyl alcohol is produced by treating polymerized vinyl esters with an alkaline reagent, and more specifically with an alkaline reagent in an alcoholic medium. In U. S. P. 1,897,856 to Noller is disclosed a process wherein the foregoing reaction is carried on in the presence of water. Both of these reactions are fundamentally saponification reactions, the result of which is to leave the desired polymerized vinyl alcohol contaminated to a more or less extent with alkaline salt. While by further refining methods the alkaline salt can be removed from such prior art product in case of necessity, it has still remained to provide a process of producing polymerized vinyl alcohol practically free of such contaminating or objectionable salts.

According to this invention, we have made the unexpected discovery that polymerized vinyl alcohols can be obtained by treatment of polymerized vinyl esters, acetals and ethers with other unpolymerized almost water free alcohols, or mixtures of alcohols. We have further found that the process is improved by the presence of certain catalytic agents and is also quicker than the previously known saponification processes. By reason of obtaining polymerized vinyl alcohols in purer form their advantages are enhanced for protective colloids, adhesives, sizing materials—chiefly for artificial silk—with and without suitable additions and fillers—for manufacturing pressed objects such as record discs, adhesives and intermediate sheets for laminated glass,— with or without additions such as glycerine and so on,—as substitutes of rubber, for medicinal and pharmaceutical purposes, printing inks and the like, in all of which fields the use of naturally purer polymerized vinyl alcohol gives better results. Also, such polymerized vinyl alcohols of increased purity give additional advantages in further treatment with chemical reagents as, for example, vulcanizing or hardening under heat with or without the addition of an aldehyde such as formaldehyde, and in the production of polymerized vinyl alcohol derivatives. Also, polymerized vinyl alcohol of increased purity as obtained by this invention gives hitherto unattained advantages in production of plates, balls, threads, films etc., which are characterized by exceptional tensile strength, flexibility and elasticity, and also are more simply and cheaply produced. In general, the polymerized vinyl alcohols obtained by this invention differ characteristically in quality from those hitherto obtained by saponification.

According to this invention polymerized vinyl alcohol is obtainable from polymerized vinyl esters, acetals and ethers, as well as partially esterified, acetalized or etherified polymerized vinyl alcohol, by univalent or polyvalent alcohols substantially free of water, and the reaction is especially catalyzed by means of small quantities of saponifying catalysts such as acids, alkalies and bases. A small amount of water present does not affect the reaction, but as the amount of water increases the specific advantages of the new process are gradually diminished. Hence, while in the following examples we prefer to use absolute alcohol, we do not intend to so limit ourselves. Among the esters may be classified, for example, chloracetate of polymerized vinyl alcohol. The reaction is also advantageously carried out in the presence of an indifferent solvent miscible with the alcohol. By a selection of the kind and the degree or polymerization of the initial polymerized vinyl compound, it is possible to produce polymerized vinyl alcohols of different degrees of polymerization, of different viscosity, water solubility and other properties.

In the known saponification processes above mentioned, the acid radicals present combine into a comparatively worthless salt, while in the process of this invention, the acid radicals combine into substances which are valuable products, e. g. easily obtainable esters. This leaves the desired polymerized vinyl alcohol practically free from impurities due to salt, thus eliminating the difficulties of freeing polymerized vinyl alcohol obtained by saponification from salts adsorbed due to its strong adsorption capacity.

Using our new process with catalysts, the reaction operation with like quantities is very much shorter and furthermore a very much smaller quantity of either alkaline or acid catalyst enables the transformation to be completed in the same or less time as in the saponification process.

Example 1

By adding to 100 grams of a 20% suspension of highly polymerized vinyl alcohol formaldehyde acetal in absolute ethyl alcohol, 3 cubic centimeters of concentrated sulphuric acid and boiling, there is formed ethyl formaldehyde acetal and salt free polymerized vinyl alcohol.

Example 2

1.2 kg. of 18% solution of highly polymerized vinyl acetate in absolute alcohol is heated to the boiling point with 45 cubic centimeters of an 11% absolute ethyl alcohol hydrochloric acid solution containing 0.4% HCl. The polymerized vinyl alcohol quantitatively formed precipitated as an easily filterable precipitate.

Example 3

1 kg. of 20% solution of low polymerized vinyl acetate in absolute ethyl alcohol is heated to the boiling point, with stirring, with 10 grams of concentrated sulphuric acid. The polymerized vinyl alcohol quantitatively obtained precipitates as a very fine white powder.

Example 4

100 grams of low polymerized vinyl acetate in 400 grams of absolute ethyl alcohol is mixed with 2% of the theoretical of a 10% solution of caustic potash in absolute ethyl alcohol. The conversion to polymerized vinyl alcohol is practically theoretical, takes place without heating, and at boiling temperature it produces in a few minutes a good filterable precipitate of polymerized vinyl alcohol.

Example 5

100 grams of polymerized vinyl butyrate in 60% solution of benzol is converted after addition of 330 grams of absolute ethyl alcohol and 3% of the theoretical of sodium ethylate into easily filterable polymerized vinyl alcohol.

Example 6

20 grams of highly or substantially completely polymerized vinyl acetate is stirred in a 15% solution in a mixture of 3 parts acetone and 1 part absolute ethyl alcohol with 3% of the theoretical of an alcoholic solution of caustic soda at boiling temperature and a quantitative yield of polymerized vinyl alcohol is obtained. In this instance, using an indifferent solvent for the starting polymerized vinyl compound from which the polymerized vinyl alcohol is to be obtained, it is possible fundamentally to use only somewhat more than the equivalent quantity of alcohol.

Example 7

100 grams of polymerized vinyl acetate in 400 grams of absolute methanol, with 2% of the theoretical of methyl alcohol solution of caustic potash with stirring and heating, is completely converted to polymerized vinyl alcohol within a few minutes.

Example 8

A 30% solution of low polymerized vinyl acetate in acetone is mixed with so much substantially water-free glycol that a 20% solution is produced and this solution is mixed with 3% of the theoretical with sodium ethylate. The reaction takes place more slowly than in ethyl alcohol or methanol, but within 20 minutes the polymerized vinyl alcohol precipitates and can be easily recovered.

Example 9

5 grams of polymerized vinyl chloracetate is dissolved in 10 grams of substantially water-free acetone, and transformed with 10 grams of absolute ethyl alcohol containing 3% dry ammonia (about 4% of theoretical) under pressure at 120° C. in 90 minutes. The yield of polymerized vinyl alcohol was quantitative and it precipitated and could be easily separated.

The invention claimed is:

1. Process for obtaining polymerized vinyl alcohol from a derivative thereof which comprises reacting a hydrolyzable polymerized vinyl alcohol derivative with an absolute aliphatic liquid alcohol in the presence of a hydrolyzing catalyst in an amount sufficient to catalyze the reaction yet substantially less than the molecular equivalent of the polymerized vinyl derivative and precipitating the polymerized vinyl alcohol as formed.

2. Process for obtaining polymerized vinyl alcohol from a derivative thereof which comprises heating a polymerized vinyl alcohol derivative selected from the group consisting of its esters, ethers and acetals in a medium containing an absolute aliphatic liquid alcohol and in the presence of a relatively small amount of a base, the amount of said base being sufficient to catalyze the reaction yet substantially less than the theoretical quantity required to completely saponify said polymerized vinyl alcohol derivative by formation of the corresponding salt and precipitating the polymerized vinyl alcohol as formed.

3. Process for obtaining polymerized vinyl alcohol from a derivative thereof which comprises heating a polymerized vinyl alcohol derivative selected from the group consisting of its esters, ethers and acetals and a medium containing an absolute aliphatic liquid alcohol and in the presence of an acid hydrolyzing catalyst in an amount sufficient to catalyze the reaction but substantially less than the molecular equivalent of the polymerized vinyl derivative and precipitating the polymerized vinyl alcohol as formed.

4. Process for obtaining polymerized vinyl alcohol from a derivative thereof which comprises heating a polymerized vinyl alcohol derivative selected from the group consisting of its esters, ethers and acetals and a medium containing an absolute aliphatic liquid alcohol and in the presence of an alkaline hydrolyzing catalyst in an amount sufficient to catalyze the reaction but substantially less than that theoretically required to completely saponify said polymerized vinyl alcohol derivative by formation of the corresponding salt and precipitating the polymerized vinyl alcohol as formed.

5. Process for obtaining polymerized vinyl alcohol from its chloracetate which comprises treating the chloracetate of polymerized vinyl alcohol in a medium containing an aliphatic liquid alcohol and in the presence of a small quantity of water and base, said quantity being sufficient to catalyze the reaction but less than that theoretically required to completely saponify said chloracetate by formation of the corresponding salt and precipitating the polymerized vinyl alcohol as formed.

6. Process for obtaining a polymerized vinyl alcohol from its acetate which comprises heating the polymerized vinyl acetate with an absolute aliphatic liquid alcohol in the presence of a small quantity of mineral acid, said quantity being sufficient to catalyze the reaction but substantially less than that required to completely saponify said acetate in a few hours in the presence of a considerable amount of water and continuing said heating for a time sufficient to precipitate the polymerized vinyl alcohol.

7. Process for obtaining a polymerized vinyl alcohol from its acetate which comprises heating the polymerized vinyl acetate with an absolute aliphatic liquid alcohol in the presence of a small quantity of an alkaline hydrolyzing catalyst, said quantity being sufficient to catalyze the reaction but substantially less than that theoretically required, to completely saponify said acetate by formation of the corresponding salt and continuing said heating for a time sufficient to precipitate the polymerized vinyl alcohol.

WILLY O. HERRMANN.
WOLFRAM HAEHNEL.
HERBERT BERG.